United States Patent [19]
Romans

[11] Patent Number: 5,924,740
[45] Date of Patent: Jul. 20, 1999

[54] TEST BOOKLET INCLUDING TEAR OUT ANSWER SHEETS HAVING SCRATCH-OFF ANSWER SELECTIONS

[75] Inventor: Lois E. Romans, South Lyon, Mich.

[73] Assignee: Enterprises for Continuing Education, Inc., Brighton, Mich.

[21] Appl. No.: 08/926,647

[22] Filed: Sep. 10, 1997

[51] Int. Cl.⁶ ........................................... G09B 3/00
[52] U.S. Cl. .................. 283/100; 283/102; 434/353; 434/363
[58] Field of Search ..................... 283/100, 103, 283/105, 111, 67, 70, 903, 50, 52, 52.1, 48.1, 49, 51, 63.1; 434/353, 363, 322, 354, 361; 402/79; 281/38

[56] References Cited

U.S. PATENT DOCUMENTS

| | | | |
|---|---|---|---|
| 3,883,161 | 5/1975 | McGee et al. | 283/50 |
| 4,726,608 | 2/1988 | Walton | 283/102 X |
| 4,815,766 | 3/1989 | Buchanan | 281/26 |
| 4,943,239 | 7/1990 | Koslin | 434/353 |
| 5,190,319 | 3/1993 | Sandler | 283/102 |
| 5,522,732 | 6/1996 | Roberts et al. | 434/363 |
| 5,658,161 | 8/1997 | Roberts et al. | 434/353 |

*Primary Examiner*—Andrea L. Pitts
*Assistant Examiner*—Henry W. H. Tsai
*Attorney, Agent, or Firm*—Harness, Dickey & Pierce, P.L.C.

[57] ABSTRACT

A test booklet and method of administering a test used to receive instant continuing education credit. The test booklet includes a number of multiple choice questions where each question includes a plurality of answer selections. The question designations and answer selections are reproduced on an answer sheet that is attached to the booklet by a perforation. Each answer selection is covered by an opaque scratch-off material such that the applicant selects his or her answer by scratching off the appropriate material covering a particular answer selection. To receive the continuing education credit, the applicant tears the answer sheet from the booklet and mails in the answer sheet to an accreditation agency to be graded.

17 Claims, 3 Drawing Sheets

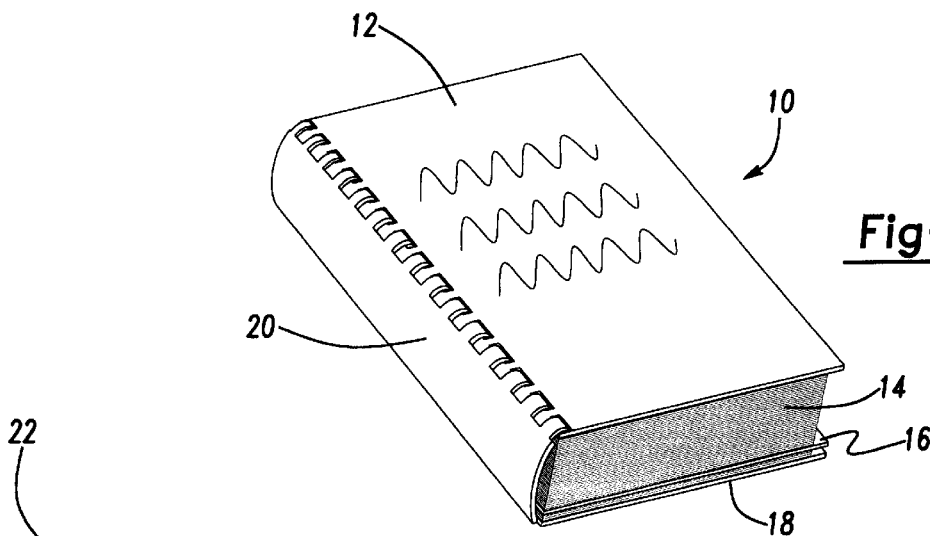

Fig-1

PHYSICS

BEAM ATTENUATION IS THE PRIMARY PHENOMENON THAT IS RESPONSIBLE FOR A COMPUTED TOMOGRAPHIC IMAGE. THIS TERM IS USED TO DESCRIBE WHAT HAPPENS WHEN AN X-RAY BEAM PENETRATES MATTER AND IS ABSORBED TO VARYING DEGREES.

MATTER THAT IS DENSE WILL ATTENUATE, OR STOP, MORE OF THE X-RAY BEAM. THEREFORE, FEWER X-RAY PHOTONS WILL REACH THE FILM, OR AS IS THE CASE IN CT, THE SYSTEMS DETECTORS. THESE AREAS WILL BE REPRESENTED ON THE IMAGE AS LIGHTER SHADES OF GRAY, OR WHITE. AN OBJECT THAT HAS THE ABILITY TO STOP MUCH OF THE X-RAY BEAM IS OFTEN DESCRIBED AS HIGH ATTENUATION.

THE NUMBER OF PHOTONS THAT WILL INTERACT WILL INCREASE WITH THE THICKNESS, DENSITY, AND CHEMICAL MAKEUP OF THE TISSUE. IMAGINE AN X-RAY PHOTON ON IT'S WAY TO THE FILM OR CT DETECTOR. THE MORE ATOMS IN THE PATH OF THE PHOTON, THE MORE LIKELY IT WILL INTERACT WITH AT LEAST ONE OF THE ATOMS.

MATTER OF LOW DENSITY, SUCH AS AIR, WILL HAVE LITTLE ATTENUATION ABILITY; THEREFORE' MORE X-RAY WILL PASS THROUGH TO STRIKE THE FILM OR DETECTORS. THESE LOW-DENSITY AREAS WILL BR REPRESENTED BY DARK AREAS ON THE IMAGE.

Q1. WHICH OF THE FOLLOWING WOULD BE CONSIDERED A HIGH-ATTENUATION LESION?

A. A BULLA WITHIN THE LUNG
B. A RENAL CYST
C. A FATTY TUMOR (LIPOMA)
D. A CALCIFIED NODULE IN THE LUNG

TEST BOOKLET INCLUDING TEAR OUT ANSWER SHEETS HAVING SCRATCH-OFF ANSWER SELECTIONS

BACKGROUND OF THE INVENTION

1. Field of the Invention

This invention relates generally to a test booklet and, more particularly, to a test booklet that includes one or more tear-out answer sheets that can readily be removed from the booklet to be mailed, where the answer sheets include answer selections to questions within the book that are selected by scratching off a rub out material to expose the answer selection below. The test booklet has particular application for receiving continuing education instant credit at home.

2. Discussion of the Related Art

Certain disciplines and/or professions sometimes require that the persons involved in or practicing the profession periodically receive continuing education (CE) on subject matter related to the profession so that the persons update and maintain their skills, and/or renew their licenses associated with the profession. For example, radiologic technologists are currently required to renew their license every two years by receiving twenty-four CE credits that requires a showing of their knowledge on various topics. These topics include computer tomography, general radiography, magnetic resonance imaging and cardiovascular interventional radiography. Other professions requiring continuing education obviously require a showing of knowledge in other areas.

For some professions, continuing education is received by the person by taking tests that are then graded by an accredited organization to determine whether the person will receive credit. Heretofore these types of tests were generally administered at a testing facility to a group of persons under a controlled environment. Such tests usually required the individuals to read a series of questions and write down an appropriate answer, such as selecting a multiple choice answer to a particular question, within a certain period of time. In this situation, the individuals are required to go to the particular testing facility at a particular time for a certain amount of time. Obviously, the individuals may be inconvenienced by such a practice.

What is needed is a technique for allowing a person to receive continuing education credit at his or her leisure, for example at home, and mail in the answers to then be graded by an accredited agency to determine if the continuing education credit can be given. It is therefore an object of the present invention to provide such a testing technique and associated test booklet.

SUMMARY OF THE INVENTION

In accordance with the teachings of the present invention, a test booklet and method of administering a test is disclosed in which an applicant required to take the test to receive, for example, continuing education credit, purchases the test booklet through the mail or otherwise. The test booklet includes questions, such as multiple choice questions, that may be separated into one or more categories or related technologies, such that if the applicant answers enough of the questions correctly, he or she will be awarded continuing education credits. Each section includes an answer sheet that is attached to the booklet by a perforation, or other suitable tear-away mechanism, so that the answer sheet can be readily removed from the booklet. In one embodiment, the answer sheet is made of cardboard or a higher grade paper than the other pages of the book.

The answer sheet includes a designation for each question and a designation for each answer selection for the question. Each answer selection is covered by a scratch-off or rubaway material, such as a silver rub. The correct answer to each question is designated by one symbol, and each of the incorrect answers is designated by another symbol. Therefore, if the applicant scratches off one answer selection for a particular question, and the correct answer symbol is uncovered, the applicant will get credit for correctly answering that question. If, on the other hand, the applicant scratches off an answer that has the incorrect answer symbol, or scratches off more than one answer selection, the applicant will get credit for a wrong answer to that question. Once the applicant finishes answering all of the questions on a particular answer page, he or she will tear out the answer sheet and mail just the answer sheet to the particular accreditation agency, who will then grade the answer sheet based on the scratched off answers. Thus, the applicant will be able to receive continuing education credit by testing at home, and will be able to keep the test booklet.

Additional objects, advantages, and features of the present invention will become apparent from the following description and the appended claims, taken in conjunction with the accompanying drawings.

BRIEF DESCRIPTION OF THE DRAWINGS

FIG. 1 is a perspective view of a test booklet according to an embodiment of the present invention;

FIG. 2 is a page from the test booklet shown in FIG. 1 including a question and multiple choice answer selections;

FIG. 3 is an answer page from the test booklet shown in FIG. 1 including all of the question numbers to a particular section in the test booklet and all of the answer selections to the question;

DETAILED DESCRIPTION OF THE PREFERRED EMBODIMENTS

Figure 4:
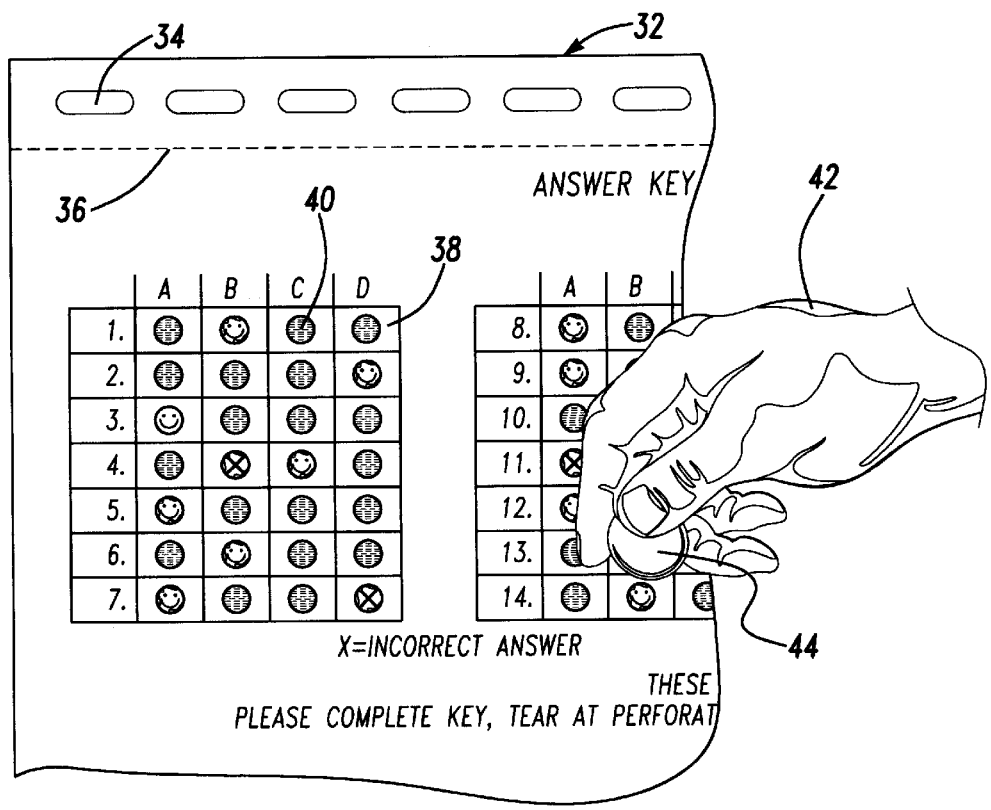
FIG. 4 is a broken away view of the answer sheet of FIG. 3 where the applicant has scratched off answers to the questions.

The following description of the preferred embodiments directed to a test booklet and method of administering a test for receiving continuing education instant credit at home is merely exemplary in nature, and is in no way intended to limit the invention or its applications or uses.

FIG. 1 shows a perspective view of a test booklet 10 including questions and answers to be used to receive continuing education credit in accordance with the teachings of the present invention. The booklet 10 has a front cover 12 that includes a title defining the particular subject matter relating to the questions in the booklet 10. The booklet 10 has a plurality of pages 14, where some of the pages are information pages, some of the pages include questions and answer selections, and some of the pages include mail-in answer sheets, as will be discussed in more detail below. One or more dividers 16 can be provided in the test booklet 10 to separate the questions into a plurality of different related subject matters. The cover 12, the pages 14 and a back cover 18 are bound by a spiral binder 20. The cover 12 and the plurality of pages 14 are made of paper, for example a recycled paper, and the spiral binder 20 is made of a suitable plastic to make the test booklet 10 as inexpensive as possible. Of course, the cover 12, the pages 14, and the binder 20 can be made of any suitable material for the purposes of the present invention. An applicant for testing will purchase the booklet 10 containing the desirable subject matter by ordering the booklet 10 through the mail or purchasing it at a certain location in order to receive instant continuing education credit. The applicant may be required to purchase more than one of the test booklets 10 for different subject matters depending on the particular applicant's discipline.

FIG. 2 shows a question page 22 including a plurality of elongated holes 24 that allow the page 22 to be secured to the binder 20. The page 22 includes a discussion section 26 at the top of the page 22, a question 28, identified by a question designation Q1, and an answer section 30 including a series of multiple choice answer selections identified by a separate answer designation A–D at the bottom of the page 22. The question page 22 is one of a plurality of question pages that may be separated into particular subject matters and separated, for example, by the dividers 16. In this example, the question 28 is a multiple choice question where one of the answer selections identified by the answer designation A–D is the only or best answer. The applicant will read the discussion section 26 and the question 28, and select the appropriate answer designation A–D from the answer section 30 to take the test. The format of the question and answer selections can vary from test booklet to test booklet. Although a multiple choice question is shown, it is possible that other types of questions can also be provided within the scope of the present invention. Additionally, the discussion section 26 can include other description besides text, such as figures. Also, more than one question can be included on a single question page.

Figure 3:
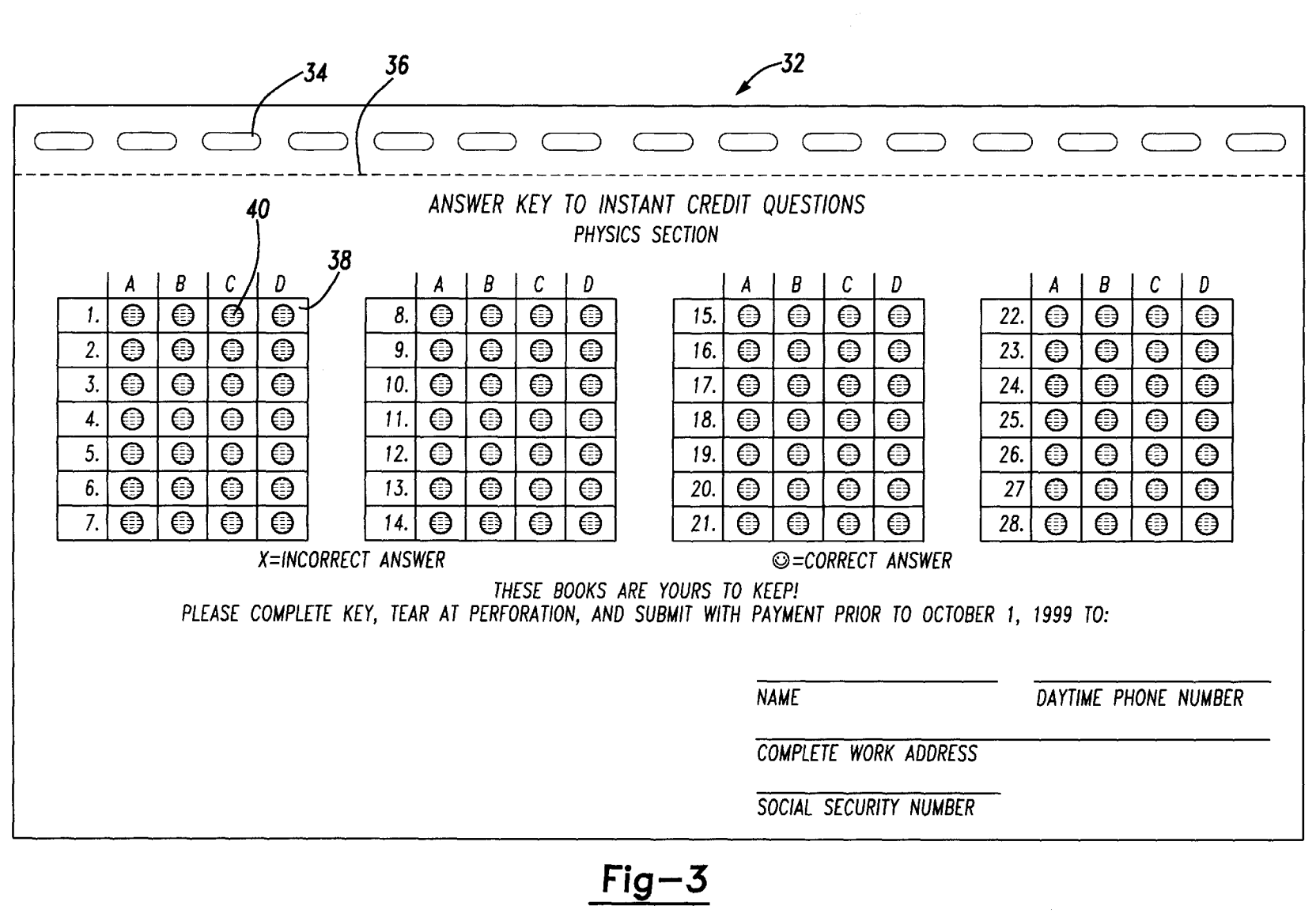

FIG. 3 shows an answer sheet 32 including a plurality of elongated holes 34 that allow the answer sheet 32 to be secured to the binder 20. The answer sheet 32 includes all of the question number designations (1–28) for a particular question section, here the Physics Section, within the test booklet 10. The answer sheet 32 includes a perforation 36 extending adjacent to and along the holes 34. The question number designations and answer designations are set out in a matrix where the question designations are in vertical columns and the answer designations A–D are in horizontal rows. An answer correctness indication symbol for each answer designation A–D for a particular question is printed within an answer selection box 38 defined by the matrix. Each answer correctness indication symbol in each answer selecting box 38 is covered by a circular-shaped opaque coating of a scratch-off or rub-away material 40. In this embodiment, the scratch-off material is silver rub available from General Formulations, Inc. of Sparta, Mich., and has ingredients including a heavy aromatic naphtha and mineral spirits.

The answer correctness indication symbol in each box 38 is printed on the answer sheet 32 along with certain test information by any suitable printing technique prior to being covered by the material 40. A suitable machine or device (not shown) applies the material 40 within the box over each answer correctness indication symbol in a liquid format. The material 40 then dries, and when the material 40 is scratched or rubbed from the answer sheet 32, the answer correctness indication symbol is exposed and can be read below. In this embodiment, the answer sheet 32 is made of a high grade cardboard to better stand up to the rigors of being rubbed to remove the material 14, and being mailed. Of course, any material capable of being printed on and covered by the material 40, and allow the material 40 to be rubbed away to expose the answer correctness indication symbol below, can be used.

FIG. 4 shows a cut-away portion of the answer sheet 32 in which some of the answer correctness indication symbols have been exposed by rubbing away the material 40. In this example, the applicant, whose hand 42 is shown, uses a coin 44 to rub away the material 40 from the answer sheet 32 based on his or her belief of what is the right answer. In this embodiment, a correct answer is designated by a "smiley face" and an incorrect answer is designated by an "X". Only one answer designation A–D for a particular question has a smiley face, and the remaining answer selection have the X. As is apparent from viewing FIG. 4, the applicant has scratched off the correct answer for questions 1, 2, 3, 5, 6, 8, 9, 12 and 14, and has scratched off the incorrect answer to questions 4, 7 and 11. The applicant has also scratched off more than one answer to questions 4 and 7, thus indicating that the right answer was eventually uncovered, but was not the first selection.

Figure 5:
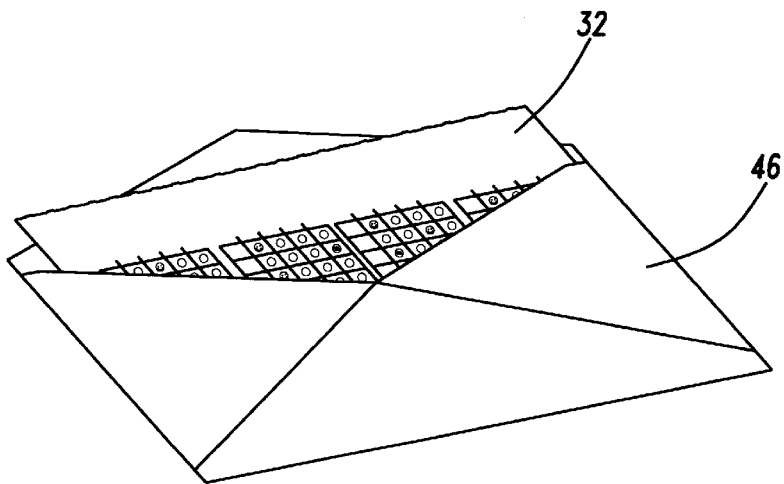
FIG. 5 is a perspective view depicting the completed answer sheet being inserted into an envelope for mailing.

Once the applicant has selected all of the answers, he or she will tear the answer sheet 32 from the test booklet 10 along the perforation 36. Of course, the applicant can remove the answer sheet 32 from the booklet 10 prior to answering the questions. The answer sheet 32 includes instructions of where to mail the answer sheet 32 to receive continuing education credit. The applicant then mails the answer sheet 32 or answer sheets in an envelope 46, as depicted in FIG. 5, along with appropriate payment to receive the CE Instant Credit.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. A test booklet comprising:

a plurality of question pages, each of the plurality of pages including at least one question and a plurality of answer selections that are possible answers to the at least one question, wherein the at least one question is identified by a readable question designation and the plurality of answer selections are identifed by different readable answer designations; and at least one answer sheet, said at least one answer sheet including the readable question designation for each of a plurality of questions contained within the booklet and the readable answer designation for each of the plurality of answer selections for each question, said at least one answer sheet further including an answer correctness indication symbol for each of the plurality of answer designations, wherein of the correctness indication symbols on the at least one answer sheet is covered by an opaque rub-away material that is operable to be rubbed away so as to expose the correctness indication symbol below.

2. The test booklet according to claim 1 wherein the at least one answer sheet includes a perforation to allow the answer sheet to be readily removed from the test booklet.

3. The test booklet according to claim 1 wherein the at least one answer sheet includes a matrix of the correctness indication symbols, said readable question designations for each of the plurality of questions being in one of either a row or a column of the matrix, and the readable answer designation for each of the plurality of answer selections for each question being in the other row or column of the matrix.

4. The test booklet according to claim 1 wherein the rub away material is a silver rub including a heavy aromatic naphtha and mineral spirits.

5. The test booklet according to claim 1 wherein the answer sheet is made of a cardboard material and the plurality of pages are bound by a plastic spiral binder.

6. The test booklet according to claim 1 wherein each correctness indication symbol is one of either a common right answer symbol or a common wrong answer symbol.

7. The test booklet according to claim 1 wherein the at least one answer sheet includes instructions for where to mail the answer sheet to be graded.

8. The test booklet according to claim 1 further comprising a plurality of dividers separating the plurality of question pages into separate sections.

9. The test booklet according to claim 8 wherein each separate section includes a separate answer sheet.

10. A test booklet for receiving continuing education instant credit, said booklet comprising:

a plurality of question pages, each of the plurality of pages including at least one question and a plurality of answer selections that are as possible answers to the at least one question, wherein the at least one question is identified by a readable question designation and the plurality of answer selections are identified by different readable answer designations, said plurality of question pages being made of paper; and at least one answer sheet, said at least one answer sheet including a readable question designation for each of a plurality of questions contained within the booklet and a plurality of readable answer designations for each of the plurality of answer selections for each question, said at least one answer sheet further including an answer correctness indication symbol for each of the plurality of answer designations, wherein the plurality of question designations and the plurality of answer designations are arranged in a matrix on the answer sheet so that the readable question designations are in one of either a row or a column, and the readable answer designations are in the other row or column, said at least one answer sheet being made of a higher grade paper than the plurality of question pages, wherein each of the correctness indication symbol is covered by an opaque rub-away material that is operable to be rubbed away so as to expose the correctness indication symbol below, said at least one answer sheet including a perforation to allow the answer sheet to be readily removed from the test booklet.

11. A test booklet according to claim 10 wherein the plurality of question pages and the at least one answer sheet are bound by a plastic spiral binder.

12. The test booklet according to claim 10 wherein the at least one answer sheet includes instructions for where to mail the answer sheet to be graded.

13. The test booklet according to claim 10 further comprising a plurality of dividers separating the plurality of pages into separate sections.

14. A method of taking a test comprising the steps of:

providing a test booklet, said test booklet including a plurality of question pages having at least one question and a plurality of answer selections that are possible answers to the at least one question, said test booklet further including at least one answer sheet, wherein the at least one question is identified by a readable question designation and the plurality of answer selections are identified by different readable answer designations, said at least one answer sheet including a readable question designation for each of a plurality of questions contained within the booklet and a plurality of readable answer designations for each of the plurality of answer selections for each question, and wherein a correctness indication symbol for each answer designation on the at least one answer sheet is covered by an opaque rub-away material so that the answer selection is not readable below;

selecting an answer selection to each of the plurality of questions by rubbing away the rub-away material covering the correctness indication symbol identifying answer selection to expose the symbol below;

removing the at least one answer sheet from the test booklet; and mailing the removed answer sheet from the test booklet to an accredited agency to be graded.

15. The method according to claim 14 wherein the step of removing the at least one answer sheet from the test booklet includes removing the answer sheet along a perforation line on the at least one answer sheet.

16. The method according to claim 14 wherein the step of providing a test booklet includes providing an answer sheet that includes a matrix of correctness indication symbols, the readable question designations for each of the plurality of questions being in one of either a row or column of the matrix, and the readable answer designation for each of the plurality of answer selections for each question being in the other row or column of the mat.

17. The method according to claim 14 wherein the step of providing a test booklet includes providing a test booklet including pages made out of a paper material bound by a plastic spiral binder, wherein the at least one answer sheet is made of a higher grade paper material than the other pages in the booklet.

* * * * *

UNITED STATES PATENT AND TRADEMARK OFFICE
CERTIFICATE OF CORRECTION

PATENT NO. : 5,924,740
DATED : July 20, 1999
INVENTOR(S) : Lois E. Romans.

It is certified that error appears in the above-identified patent and that said Letters Patent is hereby corrected as shown below:

| | |
|---|---|
| Col. 3, line 59: | after "box" insert --38--. |
| Col. 4, line 55 (Claim 1): | after "wherein" insert --each--. |
| Col. 5, line 46 (Claim 10): | "symbol" should be --symbols--. |
| Col. 6, line 28 (Claim 14): | after "identifying" insert --the--. |
| Col. 6, line 45 (Claim 16): | "mat" should be --matrix--. |

Signed and Sealed this

Twenty-first Day of March, 2000

Attest:

Q. TODD DICKINSON

Attesting Officer     Commissioner of Patents and Trademarks